(12) United States Patent
Yan et al.

(10) Patent No.: US 8,477,503 B2
(45) Date of Patent: Jul. 2, 2013

(54) SWITCH CABINET CONNECTION AND COMBINATION APPARATUS AND METHOD OF MANUFACTURING THE SAME

(75) Inventors: Huaizhong Yan, Shanghai (CN); Jie Yu, Shanghai (CN)

(73) Assignee: Shanghai Guangdian Electric Group Co., Ltd., Shanghai (CN)

( * ) Notice: Subject to any disclaimer, the term of this patent is extended or adjusted under 35 U.S.C. 154(b) by 387 days.

(21) Appl. No.: 12/652,500

(22) Filed: Jan. 5, 2010

(65) Prior Publication Data

US 2011/0164387 A1    Jul. 7, 2011

(51) Int. Cl.
*H05K 5/00* (2006.01)

(52) U.S. Cl.
USPC .......................................................... 361/724

(58) Field of Classification Search
USPC ................. 361/724, 600, 605, 608, 611, 614, 361/617–618, 620, 623, 660
See application file for complete search history.

(56) References Cited

U.S. PATENT DOCUMENTS

| 6,205,017 | B1 * | 3/2001 | Wilkie et al. | 361/605 |
| 7,450,368 | B2 * | 11/2008 | Parker et al. | 361/611 |
| 2009/0231810 | A1 * | 9/2009 | Liang et al. | 361/699 |
| 2011/0096468 | A1 * | 4/2011 | Fink | 361/618 |

FOREIGN PATENT DOCUMENTS

| CN | 2245284 | 1/1997 |
| CN | 2447928 | 9/2001 |
| CN | 2643522 | 9/2004 |
| CN | 1284288 | 11/2006 |
| CN | 201188509 | 1/2009 |

* cited by examiner

*Primary Examiner* — Jeremy Norris
*Assistant Examiner* — Tremesha S Willis
(74) *Attorney, Agent, or Firm* — Patterson Thuente Pedersen, P.A.

(57) ABSTRACT

The present invention discloses a switch cabinet connection and combination apparatus, wherein upper line-in/line-out terminals of a medium-voltage switch cabinet are connected to upper contact boxes via a conductor, and lower line-in/line-out terminals thereof are connected to lower contact boxes via the conductor, and remaining gaps to be insulated are filled with a solid insulating material. The present invention further discloses a method of manufacturing a switch cabinet connection and combination apparatus including the steps of: connecting upper line-in/line-out terminals of a medium-voltage switch cabinet via a conductor to upper contact boxes; connecting lower line-in/line-out terminals thereof via the conductor to lower contact boxes; and pouring a solid insulating material for molding. The present invention realizes high reliability, small volume, and no pollution of the medium-voltage switch cabinet.

16 Claims, 8 Drawing Sheets

SWITCH CABINET CONNECTION AND COMBINATION APPARATUS AND METHOD OF MANUFACTURING THE SAME

FIELD OF THE INVENTION

The present invention relates to the technical field of power transmission and distribution, and more specifically to a connection and combination apparatus between line-in and line-out (not including a circuit breaker) of a switch cabinet and a method of manufacturing the same.

BACKGROUND OF THE INVENTION

At present, a small-volume medium-voltage switch cabinet in a 3.6~40.5 kV power system is a gas-filled cabinet filled with SF6 (sulfur hexafluoride) gas as an insulating medium. However, under conditions of high power electric arc, spark discharge and corona discharge, the SF6 gas will decompose and dissociate various substances, and the decomposed and dissociated substances will react with oxygen, water, metal and insulating materials to generate some toxic matters. For a long time, since the gas-filled cabinet filled with SF6 gas as an insulating medium cannot be absolutely sealed, a phenomenon that the gas leaks necessarily exists. The following problems accordingly occur:

day by day, leakage of the toxic gas generated from the decomposition of SF6 gas will harm operators and the ambient environment;

there are six greenhouse gases that are discharged from human activities, and SF6 gas is one of them, with a lifespan of 3400 years and thus has a potential threat to the "greenhouse effect";

when the SF6 gas leaks to a certain ratio without charging in time and thus results in inadequacy of the insulating intensity, it will damage devices and cause safety accidents;

a recycling apparatus for the SF6 gas is so expensive and it's popularity is limited. In addition, it's utilization is poor and is usually used in device mounting and repairing only. Some of middle or small enterprises are not equipped with the SF6 gas recycling apparatus at all, leading to environment and safety risks.

Presently, there is no SF6 gas recycling apparatus that can regenerate the SF6 gas, so recycling of SF6 gas is very poor. Exhaust gas is let out to air directly or only through simply filtering and adsorbing.

So, in the future medium-voltage electrical industry, it appears that an electrical appliance with less or no SF6 gas is a developing trend of the medium-voltage electrical manufacturing industry.

SUMMARY OF THE INVENTION

In view of the above, the present invention provides a switch cabinet connection and combination apparatus and a method of manufacturing the same, such that the switch cabinet apparatus can be made with high reliability, small volume, and without pollution.

The medium-voltage switch cabinet solid state insulating functional combination apparatus proposed by the invention is a switch cabinet connection and combination apparatus, wherein upper line-in/line-out terminals of a medium-voltage switch cabinet are connected to upper contact boxes via a conductor, and lower line-in/line-out terminals thereof are connected to lower contact boxes via the conductor, and remaining gaps to be insulated are filled with a solid insulating material.

In the apparatus, respective upper line-in/line-out terminals, upper contact boxes, lower line-in/line-out terminals, lower contact boxes of three phases of A, B, C in the connection and combination apparatus respectively form three independent functional units in each of which gaps to be insulated are filled with the solid insulating material.

In the apparatus, respective upper line-in/line-out terminals and upper contact boxes of the three phases of A, B, C in the connection and combination apparatus form one independent functional unit; respective lower line-in/line-out terminals and lower contact boxes of the three phases of A, B, C in the apparatus form one independent functional unit; gaps to be insulated in each functional unit are filled with the solid insulating material.

In the apparatus, respective upper line-in/line-out terminals and upper contact boxes of the three phases of A, B, C in the connection and combination apparatus respectively form three independent functional units; respective lower line-in/line-out terminals and lower contact boxes of the three phases of A, B, C in the apparatus respectively form three independent functional units; gaps to be insulated in each functional unit are filled with the solid insulating material.

In the apparatus, part of the gaps to be insulated is located in a bus chamber and a cable chamber.

In the apparatus, a pressure delivery path for determining a path is provided in an inner surface of the casing of the apparatus to deliver the pressure to a relief point.

In the apparatus, all the conductors, connection terminals and insulating resin in the apparatus are sealed-isolated from each other with a foam elastic material.

In the apparatus, the solid insulating material is insulating resin, insulating silastic, insulating plastic, insulating nylon, or insulating asphalt.

In the apparatus, the switch cabinet is a medium-voltage switch cabinet.

The present invention further provides a method of manufacturing a switch cabinet connection and combination apparatus comprising the steps of: connecting upper line-in/line-out terminals of a medium-voltage switch cabinet via a conductor to upper contact boxes; connecting lower line-in/line-out terminals thereof via the conductor to lower contact boxes, and pouring a solid insulating material for molding.

In the method, the pouring step is done once.

In the method, the pouring step comprises respectively pouring individual independent functional units of the connection and combination apparatus and then combining them.

In the method, the independent functional units are formed by connecting respective upper line-in/line-out terminals, upper contact boxes, lower line-in/line-out terminals, lower contact boxes of three phases of A, B, C in the connection and combination apparatus.

In the method, the independent functional unit is one of the following: an independent functional unit formed by upper line-in/line-out terminals and upper contact boxes of three phases of A, B, C in the connection and combination apparatus, and an independent functional unit formed by lower line-in/line-out terminals and lower contact boxes of the three phases of A, B, C in the connection and combination apparatus.

In the method, the independent functional unit is one of the following: three independent functional units formed respectively by respective upper line-in/line-out terminals and upper contact boxes of the three phases of A, B, C in the connection and combination apparatus, and three independent functional units formed respectively by respective lower line-in/line-out terminals and lower contact boxes of the three phases of A, B, C in the connection and combination apparatus.

In the method, part of the gaps to be insulated is located in a bus chamber and a cable chamber.

In the method, the solid insulating material is insulating resin, insulating silastic, insulating plastic, insulating nylon, or insulating asphalt.

It can be seen from above that, the switch cabinet connection and combination apparatus and the method of manufacturing the same, proposed by the present invention have the following advantages:

increasing reliability of the switch cabinet;

a high insulating intensity of the insulating layer made of the solid insulating material guarantees that short-circuits between phase and phase and between phase and ground do not occur, which avoids the problem that the insulating intensity of the gas-filling cabinet filled with SF6 gas as an insulating medium is reduced due to gas leakage, thereby avoiding the occurrence of accidents;

on-line monitoring in time by a temperature sensor and a PD sensor operating situations of the solid state insulating functional combination apparatus; if there is an abnormity, an alarm is issued by sound or light, and intelligence is realized by a United Security Management;

once modeling of the solid state insulating functional combination apparatus guarantees the accuracy of the mounting size of the apparatus and avoids accumulative errors when mounting the units separately;

the conductors in the functional units are absolutely isolated from air, are not influenced by dirt and thus improve environmental tolerance.

improving security;

the insulating layer of high insulating intensity made of the solid insulating material between phase and phase and between phase and ground realizes mutual isolation, eliminates the occurrence of arc discharge between phase and phase and between phase and ground, and guarantees security of normal operation of the medium-voltage switch cabinet. In addition, the insulating layer will not produce toxic matters and thus improves security of operators.

reducing electrified bare portions with respect to the situation where respective functional units are connected separately, directly reducing the possibility of contact with the electrified bare portions when accidently entering electrified intervals, and thus indirectly improving security;

removing the conservation of SF6 compression gas cylinders and eliminating a security risk due to the conservation of the SF6 compression gas cylinders;

economizing on energy and environmental protection;

saving land resources: since the functional units are combined together by the solid insulating material, the size thereof is reduced with respect to the situation where they are mounted separately, which correspondingly reduces the outline size of the medium-voltage switch cabinet, thus, an area needed for mounting is reduced to thereby save land resources;

saving copper bars: after the line-in/line-out terminals are combined by the solid insulating material, the use of copper bars is reduced by 50%, thereby reducing energy consumption;

saving steel sheets: after the line-in/line-out terminals are combined by the solid insulating material, the height of the switch cabinet is reduced by 30%, the width thereof is reduced by 40%, such that the use of the steel sheet is saved 20% to thereby reduce energy consumption;

reducing pollution: the insulating layer made of the solid insulating material will not produce toxic matters and thus will not destroy the environment.

The present invention in some embodiments may use some new techniques, such as ballistic protection flameproof technique, electromagnetic shielding technique, heat emission technique, overall encapsulation crazing-proof technique.

The present invention in some embodiments is implemented in a switch cabinet of a 3.6~40.5 kV system to enable the switch cabinet apparatus to be a small volume switch cabinet apparatus as compared to SF6.

DETAILED DESCRIPTION

A more comprehensive description of the invention is given below by referring to the accompanying drawings, in which exemplary embodiments of the invention are illustrated.

The technical solution of the invention is as follows: connecting upper line-in/line-out terminals of a medium-voltage switch cabinet via a conductor to upper contact boxes, connecting lower line-in/line-out terminals thereof via the conductor to lower contact boxes (not including a circuit breaker), and pouring molding once after combining them reasonably or assembling molding after separate pouring several times. The use of a solid insulating material insulation causes an insulating distance between various electrified bodies to be greatly reduced, generally only 20 mm is enough.

Referring to FIGS. 1-5, a preferred embodiment of the invention is shown: a connection and combination solid state insulating functional apparatus between line-in and line-out (not including a circuit breaker) of a switch cabinet in a system of 3.6~40.5 kV with a rated current up to 3150 A, comprising: a solid state insulating layer 1, upper line-in/line-out terminals 2, a conductor 3, lower line-in/line-out terminals 4, lower contact boxes 5, upper contact boxes 6, a casing 7, fixing nuts 8, and a mounting plate 9.

Figure 1:
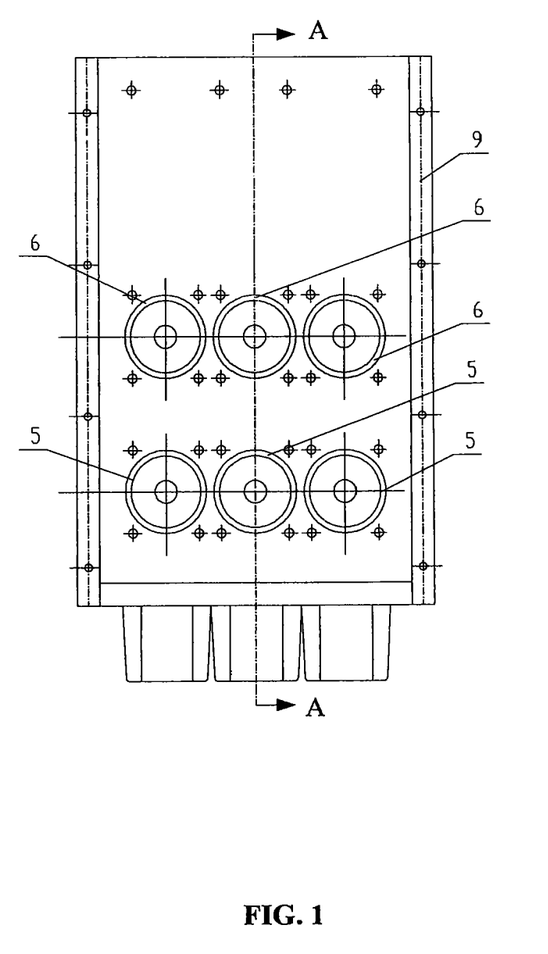
FIG. 1 is a main view of a structure of a first embodiment of the invention.
Figure 2:
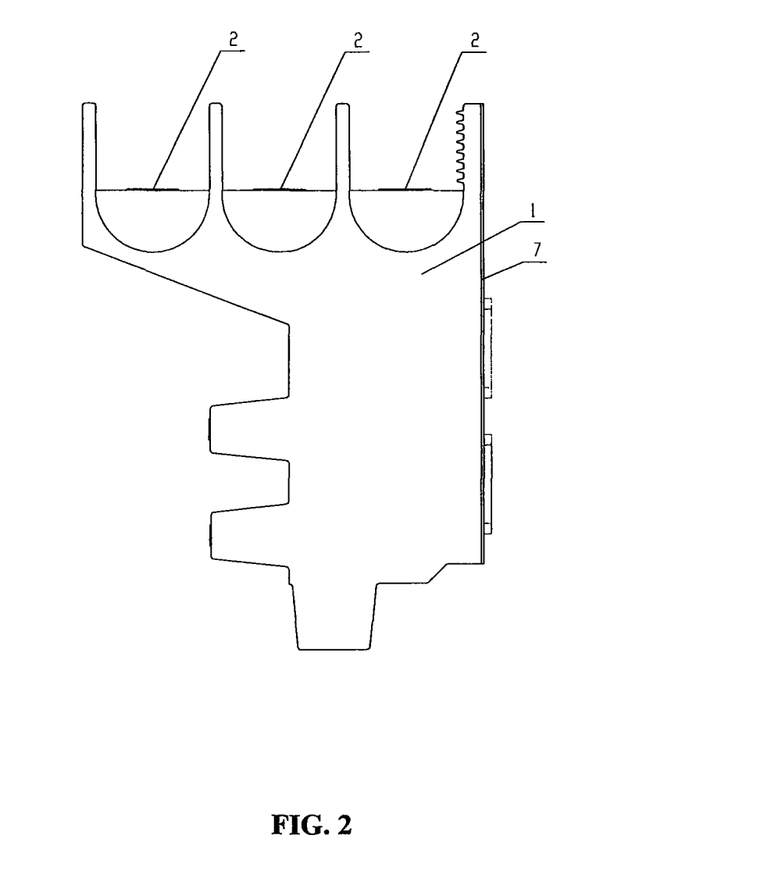
FIG. 2 is a left view of the first embodiment of the invention.
Figure 3:
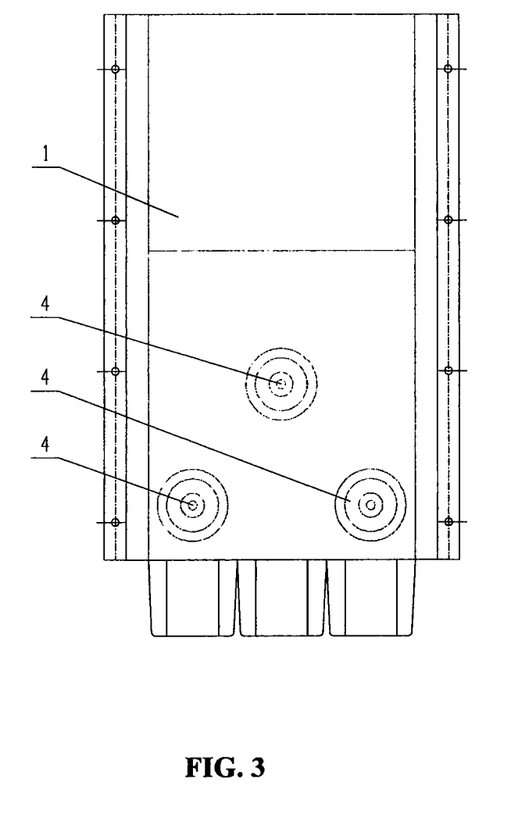
FIG. 3 is a rear view of the first embodiment of the invention.
Figure 4:
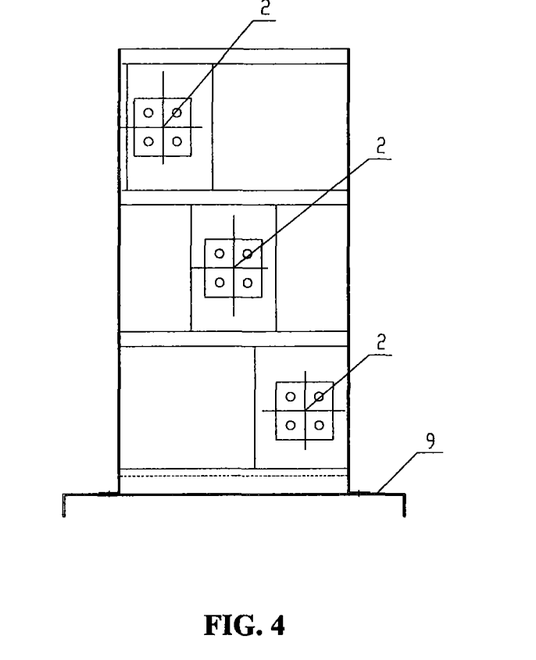
FIG. 4 is a top view of the first embodiment of the invention.

FIG. 1 is a main view of the connection and combination apparatus in the first embodiment of the invention, through which 3 lower contact boxes 5, 3 upper contact boxes 6 and the mounting plate 9 which are exposed out of the casing 7 can be seen from this view. The left view thereof is shown in FIG. 2, through which the upper line-in/line-out terminals 2, the solid state insulating layer 1 and the casing 7 can be seen from this view. FIG. 3 is a rear view thereof including the solid state insulating layer 1 and lower line-in/line-out terminals 4. FIG. 4 is a top view including upper line-in/line-out terminals 2 and the mounting plate 9.

Figure 5:
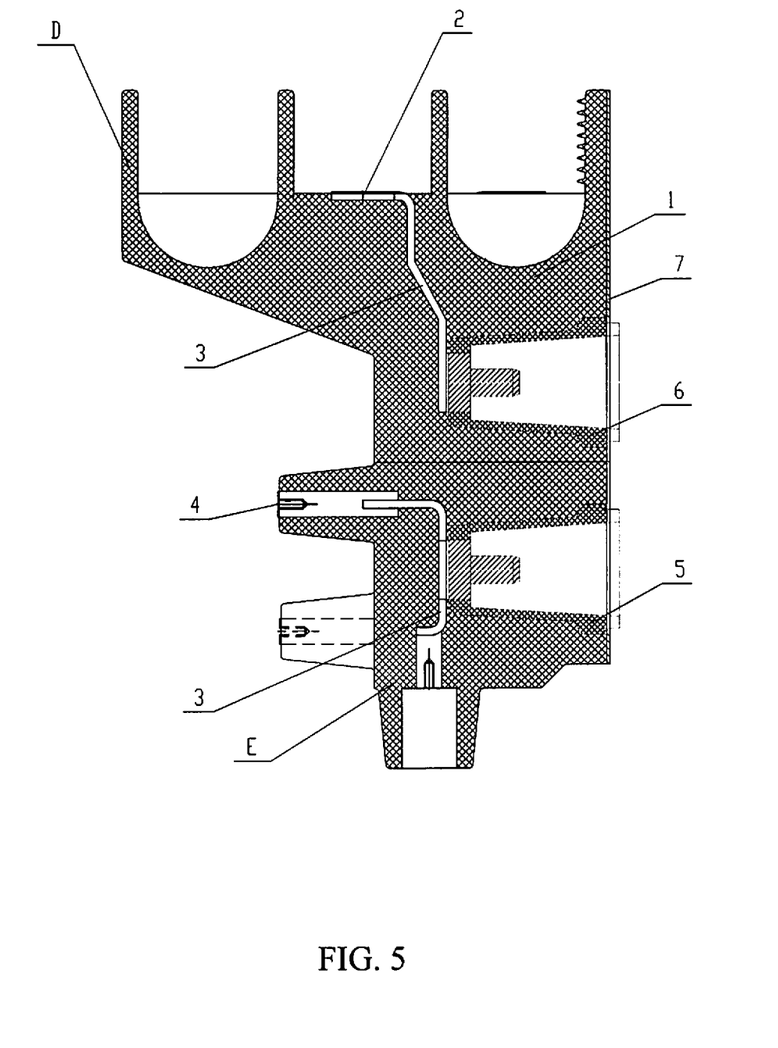
FIG. 5 is a cutaway view along a line A-A of FIG. 1.

As shown in FIG. 5, in the cutaway view along the A-A direction of FIG. 5, the upper line-in/line-out terminals 2 of the three phases of A, B, C are connected via the conductor 3 to the upper contact box 6 connected to the casing 7, and thus are upper line-in/line-out terminals; the lower line-in/line-out terminals 4 of the three phases of A, B, C are connected via the conductor 3 to the lower contact box 5 connected to the casing 7, and thus are lower line-in/line-out terminals, wherein the casing 7 may adopt an insulating material or metal material. Then, a solid insulating material is added for pouring molding once, and after pouring, the insulating material forms the solid insulating layer 1, and all the shaded portions in FIG. 5 represent the solid insulating layer 1, wherein, the solid insulating layer 1 may adopt a solid insulating material such as insulating resin, insulating silastic, insulating plastic, insulating nylon, insulating asphalt, insulating resin such as silica gel, epoxy.

In the above embodiments, by connecting the upper line-in/line-out terminals 2 of the medium-voltage switch cabinet to the upper contact boxes 6 and connecting the lower line-in/line-out terminals 4 thereof to the lower contact boxes 5 (not including the circuit breaker) with a solid insulating material, the connections are combined reasonably for pouring molding once. In addition, assembling and molding after separate pouring several times can also be used.

Figure 6A:
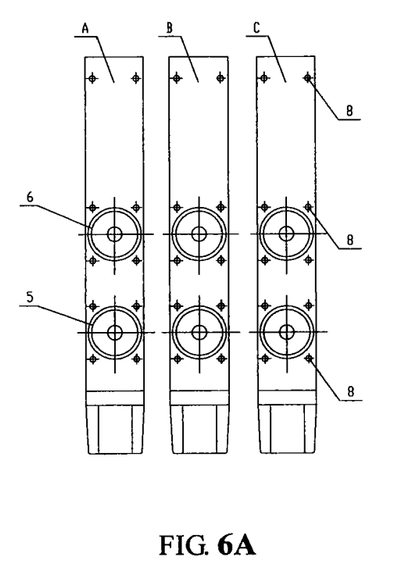
FIG. 6A is a main view after splitting the structure of a second embodiment of the invention.
Figure 6B:
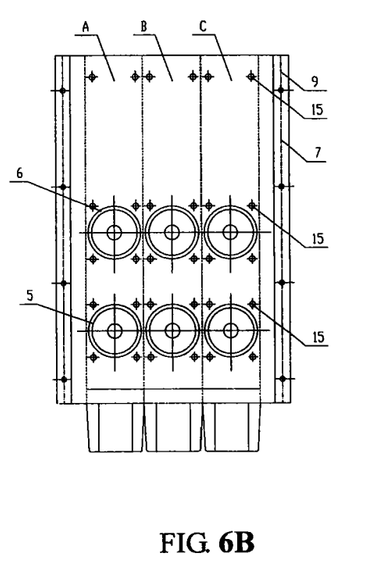
FIG. 6B is a main view after assembling the structure of the second embodiment of the invention.

In the second embodiment as shown in FIGS. 6A and 6B, the connection and combination apparatus of the invention are divided into three independent functional units A, B, and C according to different functions of the three phases of A, B and C, as shown in FIG. 6A. The upper line-in/line-out terminals 2 in each functional unit are connected to the upper contact boxes 6 via the conductor 3 as the upper line-in/line-out terminals; the lower line-in/line-out terminals 4 are connected to the lower contact boxes 5 via the conductor 3 as the lower line-in/line-out terminals; then, the solid insulating material 1 is added for pouring once as individual independent functional units for embedded poles. The three independent functional units A, B, and C, together with the mounting plate 9, are fixed at the nuts 8 via bolts 15, as shown in FIG. 6B.

Figure 7A:
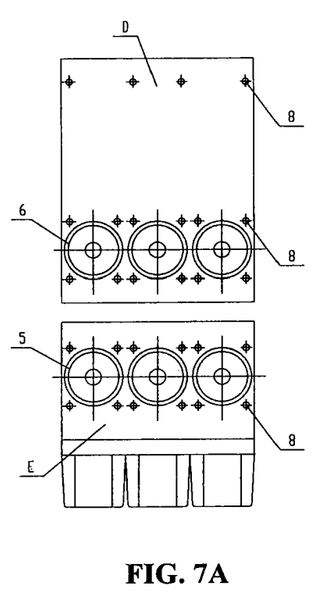
FIG. 7A is a main view after splitting the structure of a third embodiment of the invention.
Figure 7B:
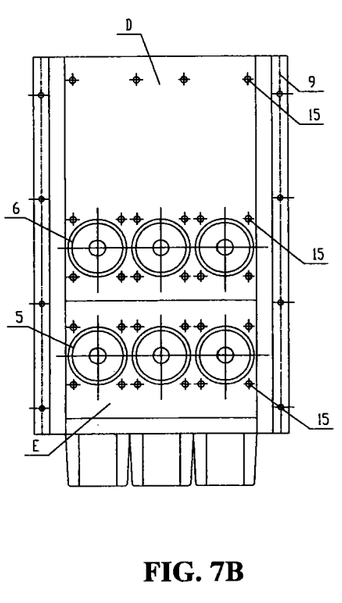
FIG. 7B is a main view after assembling the structure of the third embodiment of the invention.

In the third embodiment as shown in FIGS. 7A and 7B, the connection and combination apparatus of the invention is divided into two functional units D, E, as shown in FIG. 7A. D represents that the upper line-in/line-out terminals 2 are connected to the upper contact box 6 via the conductor 3 as the upper line-in/line-out terminals, and then the solid insulating material 1 is added for pouring molding once as an upper independent functional unit. E represents that the lower line-in/line-out terminals 4 are connected to the lower contact boxes 5 via the conductor 3 as the lower line-in/line-out terminals, and then the solid insulating material 1 is added for pouring molding once as a lower independent functional unit. The two independent functional units D, E, together with the mounting plate 9 are fixed at the nuts 8 via the bolts 15, as shown in FIG. 7B.

Figure 8A:
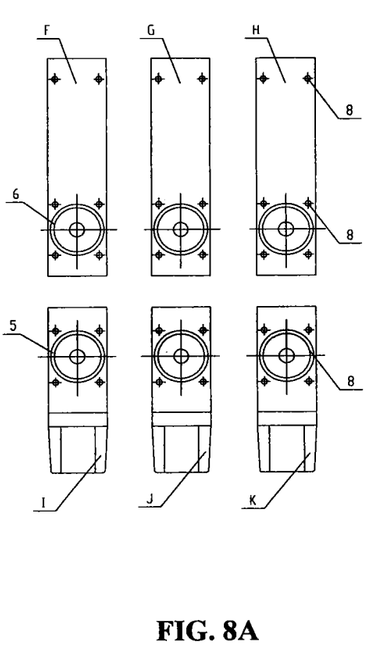
FIG. 8A is a main view after splitting the structure of a fourth embodiment of the invention.
Figure 8B:
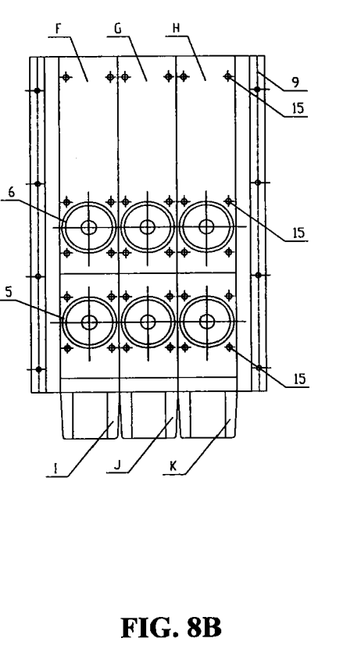
FIG. 8B is a main view after assembling the structure of the fourth embodiment of the invention.

In the fourth embodiment as shown in FIGS. 8A and 8B, the connection and combination apparatus of the invention is divided into six functional units F, G, H, I, J and K, as shown in FIG. 8A. F, G, H represent that the upper line-in/line-out terminals 2 are connected to the upper contact boxes 6 via the conductor 3 as upper line-in/line-out terminals, and then the solid insulating material 1 is added for pouring molding once as individual independent functional units. I, J, K represent that the lower line-in/line-out terminals 4 are connected to the lower contact boxes 5 via the conductor 3 as lower line-in/line-out terminals, and then the solid insulating material 1 is added for pouring molding once as individual independent functional units. The six functional units F, G, H, I, J, K, together with the mounting plate 9, are fixed at the nuts 8 via the bolts 15, as shown in FIG. 8B.

Figure 9:
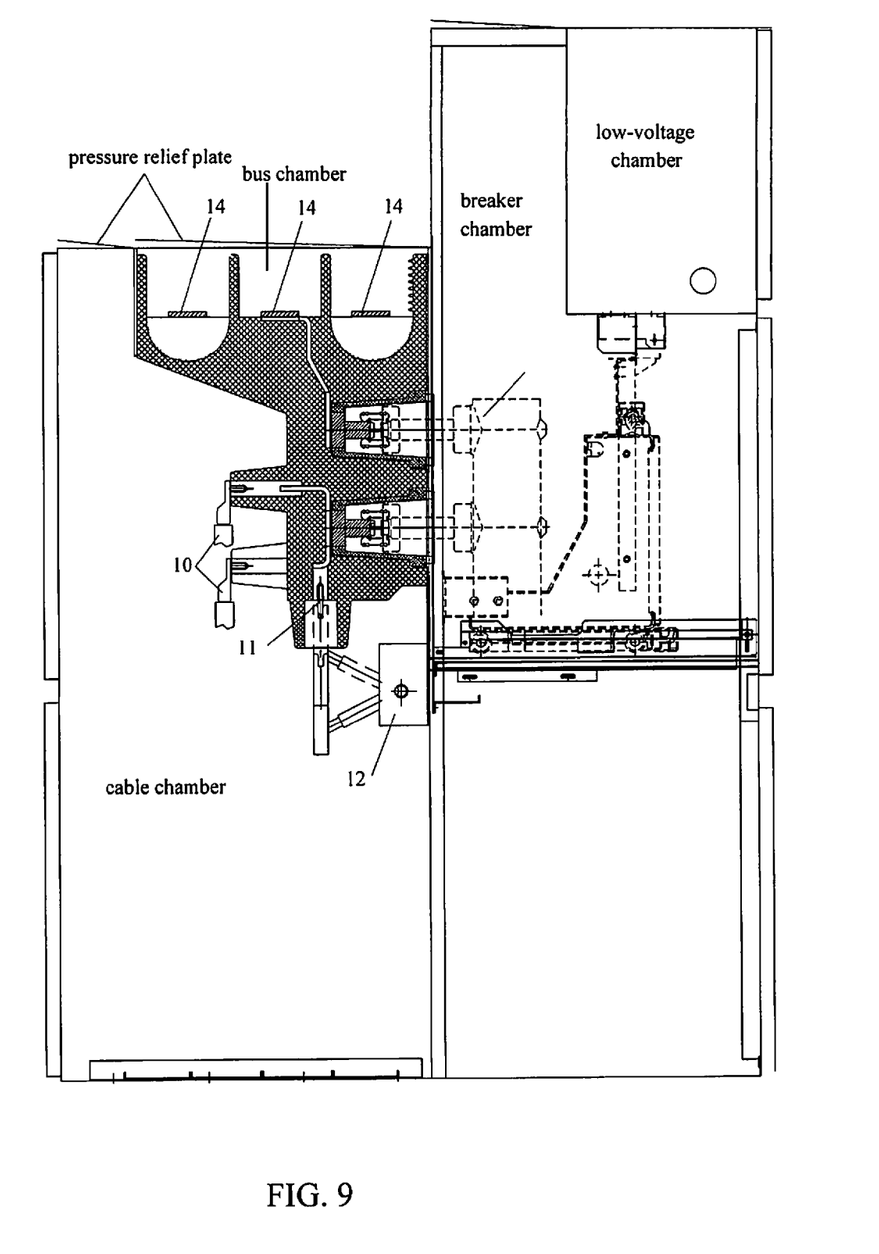
FIG. 9 is a view of a use state of the embodiments of the invention.

FIG. 9 is a diagram view showing the use state position of the connection and combination apparatus mounted in the switch cabinet. The switch cabinet can be divided generally into two parts: a fore-cabinet and a back-cabinet, the fore-cabinet includes a breaker chamber and a low-voltage chamber, and the back-cabinet includes a bus chamber and a cable chamber. The connection and combination apparatus in the embodiment of the invention is located in the bus chamber and the cable chamber of the back-cabinet. As shown in FIG. 9, cables 10 are connected to the lower line-in/line-out terminals 4 via bolts, the lower line-in/line-out terminals 4 are connected to the lower contact boxes 5 via the conductor 3, and then to the upper contact boxes 6 via a switching-on-function of a circuit breaker 13, the upper contact boxes 6 are connected to the upper line-in/line-out terminals 2 via the conductor 3, such that the individual functional units of the connection and combination apparatus of the invention form a passageway through the switching-on-function of the circuit breaker 13 to deliver electric energy.

The functional units are switched on by a connection mother-rack 14 between the cabinets and, after a corresponding combination, they can achieve the capability of receiving and distributing electric energy through on and off of the circuit breaker 13. Meanwhile, for the purpose of people and apparatus safeguarding, a bus 11 is led out to provide protection through on and off of a grounding switch 12.

The invention provides also a method of manufacturing the aforesaid switch cabinet connection and combination apparatus comprising: connecting upper line-in/line-out terminals of a medium-voltage switch cabinet via a conductor to upper contact boxes, connecting lower line-in/line-out terminals thereof via the conductor to lower contact boxes and pouring the solid insulating material for molding.

The outline of the connection and combination apparatus can be determined by a mold during the pouring process, then do pouring and remove the mold after cooling and drying it. The pouring process may be done once or several times, for example, separately pouring the independent functional units of the connection and combination apparatus and then combining them.

The independent functional units can be formed by connecting respective upper line-in/line-out terminals, upper contact boxes, lower line-in/line-out terminals, and lower contact boxes of the three phases of A, B, C of the connection and combination apparatus.

The independent functional units can be a single independent functional unit formed by respective upper line-in/line-out terminals and upper contact boxes of the three phases of A, B, C of the connection and combination apparatus; or be a single independent functional unit formed by respective lower line-in/line-out terminals and lower contact boxes of the three phases of A, B, C of the connection and combination apparatus.

The independent functional units can be three independent functional units formed by respective upper line-in/line-out terminals and upper contact boxes of the three phases of A, B, C of the connection and combination apparatus; or be three independent functional units formed by respective lower line-in/line-out terminals and lower contact boxes of the three phases of A, B, C of the connection and combination apparatus.

The size of the functional units in the invention may be reduced to save 50% of the conductive copper bar; after the line-in/line-out terminals are combined with the solid insulating material, the height of the switch cabinet is reduced by 30% than originally and the width thereof can be reduced by 40%.

The technical solution of the invention obtains a better effect by adding thereto the following technical means:

Ballistic protection flameproof technique: when a short-circuit occurs to make electric arc burn due to unpredictable reasons, high voltage gas will be generated, which will possibly render the cured insulating material to be cracked, and the pressure generated by the high pressure gas will be delivered to the casing along a crack to be safely relieved through a relief point, to thereby guarantee that the ambient environment is not harmed when a serious failure occurs.

Heat emission technique: the heat generated by the conductors (including individual upper and lower line-in/line-out terminals) inside the apparatus of the invention is directly conducted to the casing through the conductive solid state insulating material and then emitted out though the casing.

Overall encapsulation crazing-proof technique: since the cured insulating material and the conductors (including individual upper and lower line-in/line-out terminals) have different coefficients of thermal expansion, when the temperature of the overall encapsulation changes, the insulating material will be cracked to influence the insulating property. The apparatus of the invention uses overall encapsulation crazing-proof technique by using a foam elastic material to sealed-isolate the conductors from the insulating material, such that a strain generated by the conductors and the insulating material due to thermal expansion and cold contraction is absorbed by the elastic material to guarantee that the apparatus of the invention is not cracked upon overall encapsulation.

In the above embodiments, besides the solid state insulating functions, the apparatus of the invention can be added with some online detecting devices such as a current inductor, temperature sensor, PD sensor, and the online detecting devices can be poured within the solid state insulating functional combination apparatus.

The present invention is described for the sake of illustration and explanation, the disclosure of which is not intended to limit the invention only to the embodiments described herein. Many modifications and variations may be obvious to those skilled in the art. The embodiments are selected and described for better explaining principles and actual applications of the invention, such that those skilled in the art could understand the invention to thereby design various embodiments with various modifications adapted to specific uses.

What is claimed is:

1. A switch cabinet connection and combination apparatus, wherein upper line-in/line-out terminals of a medium-voltage switch cabinet are connected to upper contact boxes via first connectors, and lower line-in/line-out terminals thereof are connected to lower contact boxes via second connectors, and remaining gaps to be insulated between the upper line-in/line-out terminals, the first conductors, the upper contact boxes, the lower line-in/line-out terminals, the second conductors and the lower contact boxes are filled with a solid insulating material.

2. The apparatus of claim 1, wherein respective upper line-in/line-out terminals, upper contact boxes, lower line-in/line-out terminals, lower contact boxes of three phases of A, B, C in the connection and combination apparatus respectively form three independent functional units in each of which gaps to be insulated are filled with the solid insulating material.

3. The apparatus of claim 2, wherein respective upper line-in/line-out terminals and upper contact boxes of the three phases of A, B, C in the connection and combination apparatus form one independent functional unit; respective lower line-in/line-out terminals and lower contact boxes of the three phases of A, B, C in the apparatus form one independent functional unit; and gaps to be insulated in each functional unit are filled with the solid insulating material.

4. The apparatus of claim 1, wherein respective upper line-in/line-out terminals and upper contact boxes of the three phases of A, B, C in the connection and combination apparatus respectively form three independent functional units; respective lower line-in/line-out terminals and lower contact boxes of the three phases of A, B, C in the apparatus respectively form three independent functional units; and gaps to be insulated in each functional unit are filled with the solid insulating material.

5. The apparatus of claim 1, wherein part of the gaps to be insulated is located in a bus chamber and a cable chamber.

6. The apparatus of claim 1, further comprising a casing, wherein a pressure delivery path for determining a path is provided in an inner surface of the casing of the apparatus to deliver the pressure to a relief point.

7. The apparatus of claim 1, wherein all the conductors, connection terminals and solid insulating material in the apparatus are sealed-isolated from each other with a foam elastic material.

8. The apparatus of claim 1, wherein said solid insulating material is insulating resin, insulating silastic, insulating plastic, insulating nylon, or insulating asphalt.

9. A method of manufacturing a switch cabinet connection and combination apparatus, comprising the steps of: connecting upper line-in/line-out terminals of a medium-voltage switch cabinet via first conductors to upper contact boxes; connecting lower line-in/line-out terminals thereof via conductor second conductors to lower contact boxes; and pouring a solid insulating material for molding, wherein the solid insulating material fills remaining gaps to be insulated between the upper line-in/line-out terminals, the first conductors, the upper contact boxes, the lower line-in-line-out terminals, the second conductors and the lower contact boxes.

10. The method of claim 9, wherein said pouring step is done once.

11. The method of claim 9, wherein said pouring step comprises respectively pouring individual independent functional units of the connection and combination apparatus and then combining them.

12. The method of claim 11, wherein the independent functional units are formed by connecting respective upper line-in/line-out terminals, upper contact boxes, lower line-in/line-out terminals, lower contact boxes of three phases of A, B, C in the connection and combination apparatus.

13. The method of claim 11, wherein the independent functional unit is one of the following: an independent functional unit formed by upper line-in/line-out terminals and upper contact boxes of three phases of A, B, C in the connection and combination apparatus, and an independent functional unit formed by lower line-in/line-out terminals and lower contact boxes of the three phases of A, B, C in the connection and combination apparatus.

14. The method of claim 11, wherein the independent functional unit is one of the following: three independent functional units formed respectively by respective upper line-in/line-out terminals and upper contact boxes of the three phases of A, B, C in the connection and combination apparatus, and three independent functional units formed respectively by respective lower line-in/line-out terminals and lower contact boxes of the three phases of A, B, C in the connection and combination apparatus.

15. The method of claim 10, wherein part of the gaps to be insulated is located in a bus chamber and a cable chamber.

16. The method of claim 10, wherein, said solid insulating material is insulating resin, insulating silastic, insulating plastic, insulating nylon, or insulating asphalt.

* * * * *